United States Patent [19]

Perry

[11] 4,362,520

[45] Dec. 7, 1982

[54] FLEXIBLE ENCLOSED SHAFT

[76] Inventor: John C. Perry, 3170 Falcon Dr., Carlsbad, Calif. 92008

[21] Appl. No.: 149,254

[22] Filed: May 12, 1980

[51] Int. Cl.³ .............................................. F16D 1/00
[52] U.S. Cl. .................................. 464/149; 464/179; 464/183; 464/173
[58] Field of Search ................ 64/1 R, 1 S, 2 R, 2 P, 64/9 R

[56] References Cited

U.S. PATENT DOCUMENTS

| | | | |
|---|---|---|---|
| 670,748 | 3/1901 | Weddeler | 64/2 P |
| 776,977 | 12/1904 | Wicksteed | 64/2 P |
| 1,739,756 | 12/1929 | Granville | 64/2 P |
| 1,866,714 | 7/1932 | King | 64/2 P |
| 2,515,366 | 7/1950 | Zublin | 64/2 P |
| 2,684,581 | 7/1954 | Zublin | 64/2 P |
| 2,717,146 | 9/1955 | Zublin | 64/2 P |
| 2,957,353 | 10/1960 | Babacz | 64/2 P |
| 3,927,899 | 12/1975 | Bough | 64/2 P |

*Primary Examiner*—Ira S. Lazarus
*Attorney, Agent, or Firm*—Robert G. Upton

[57] ABSTRACT

This invention is a heavy-duty flexible shaft that accommodates for misalignments between an input and output shaft. The flexible shaft is comprised of a multiplicity of hollow, individually fabricated, interfitting members housed in a tubular, bendable shaft. Each segment is intimately engaged, one within the other, yet the segments are so designed to allow for limited longitudinal movement while restricting circumferential movement between segments during torsional transmissions from the input to the output shafts.

1 Claim, 4 Drawing Figures

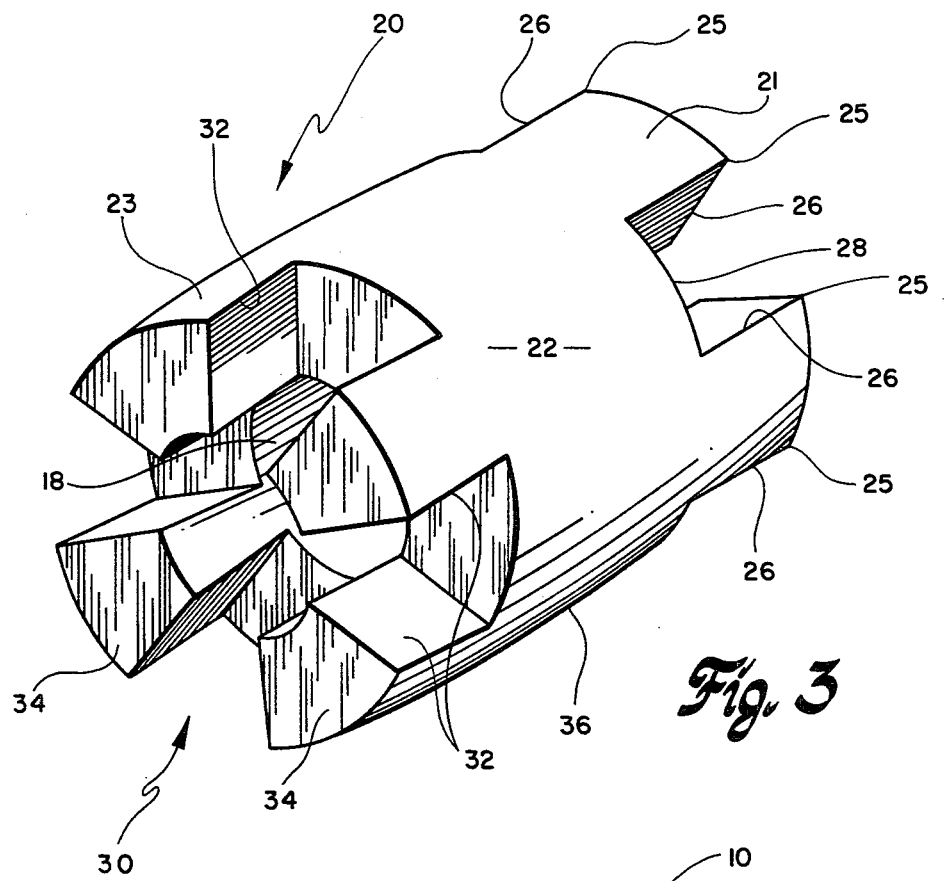
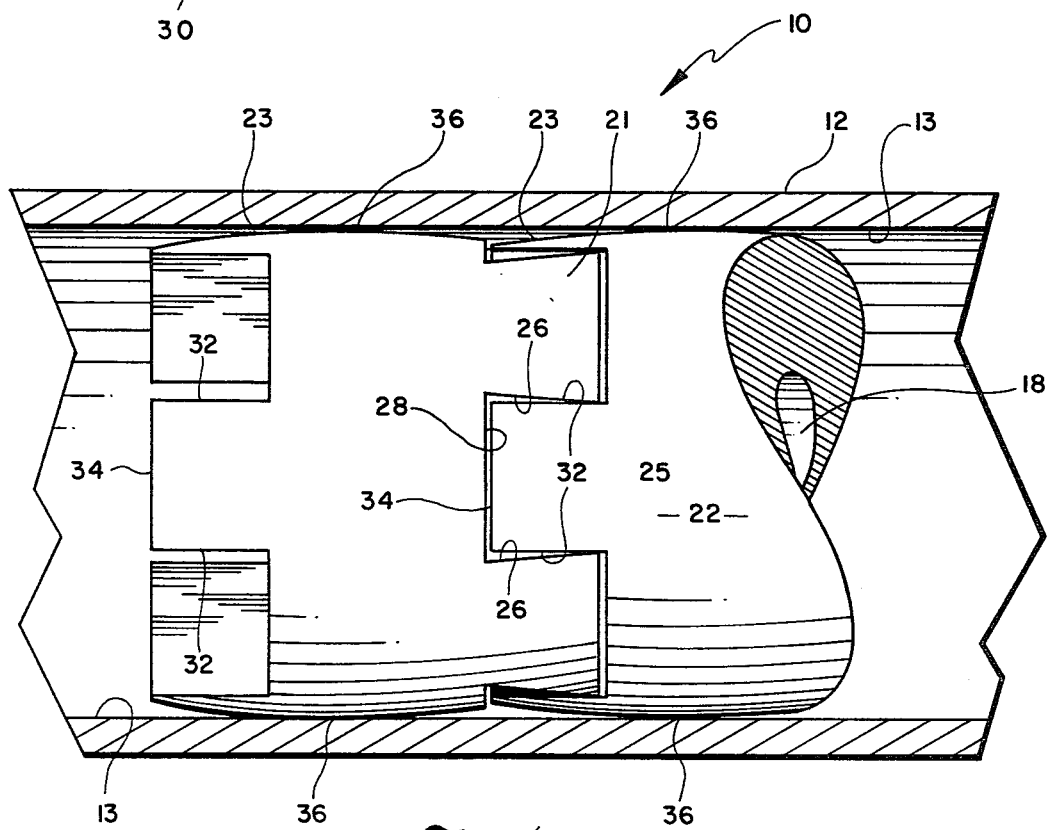

FLEXIBLE ENCLOSED SHAFT

BACKGROUND OF THE INVENTION

1. Field of the Invention

This invention relates to a flexible shaft for motion transmission along a curve.

More particularly, this invention relates to a flexible shaft for the transmission of rotary-to-rotary motion with a substantial permissible range of deviation of the angular relation between the rotary input and output axes.

2. Description of the Prior Art

There are many prior art patents having to do with flexible shaft devices.

U.S. Pat. No. 2,717,146, for example, teaches a flexible pipe for oil wells and the like. The pipe is made flexible by cutting a length of pipe into a multiplicity of interconnecting dovetailed tooth segments. The flexible pipe, with interlocked male and female segments, while it is axially flexible, each segment may be rotated one within the other. The distance the segment can move within an adjacent segment is represented by the amount of material removed by the torch used to separate the segments. The amount of movement is, of course, additive from one segment to the next. With multiple segments the rotational "slop" in the overall flexible pipe is considerable.

The foregoing design is disadvantaged in that precise rotational control is not possible due to a significant lag in the transfer of rotational movement from one end of the pipe to the next.

Another disadvantage of this device is the inability to separate the segmented pipe to remove, for example, a broken segment in the "chain" of segments.

U.S. Pat. No. 1,866,714 describes a flexible shaft wherein the shaft consists of a multiplicity of individual interlocking members positioned between an input and an output shaft. A first embodiment of the invention teaches a series of interlinked segments. Each segment has a tongue on one end and a groove in the opposite end, the groove being oriented 90° from the tongue. The interlocking portions have outwardly curving convex surfaces, thus providing single point contact between engaging surfaces.

Another embodiment of the same invention teaches interlocking segments housed within a flexible outer pipe. One segment includes cross-notches or channels at opposite ends of a first member thereof that interlocks with an adjacent cross-shaped male second member. A multiplicity of these members make up the length of the shaft. The engaging parts have outwardly curving or convex surfaces as was described relative to the first embodiment, thus providing single point contact for each tooth between male and female members.

This patent is disadvantaged in that any rotational resistance between first and second ends of the shaft will tend to axially separate the members, one from the other. The outwardly curving engaging surfaces of the interlocked members exert the separating force on the shaft. This undesirable force is especially prevalent where the outwardly curving surfaces are oriented in an axial direction. As the segments separate under a load, rotational slack is introduced in the shaft. Each segment then no longer fits into the other with close tolerances between engaging male and female parts.

The present invention obviates the foregoing disadvantages in that there is close fitting tolerances from one interfitting member to the next as long as some part of a male tooth is still engaged with a female notch or groove in an adjacent member. This design will accommodate for longitudinal movement without additional circumferential slack being induced.

Another advantage over the prior art is the ability to allow for longitudinal misalignment from an input axis to an output axis while maintaining structural integrity of the flexible shaft. Each individual segment is so structurally designed to equally divide the male and female sections, thus providing equal strength from one part of the segment to the next. There is no "weak link" in the segmented shaft to worry about if the flexible shaft is constructed within the teaching of the present invention.

SUMMARY OF THE INVENTION

It is an object of this invention to provide a strong, reversible, flexible shaft to accommodate for a misalignment between input and output rotational shafts.

More particularly, it is an object of this invention to provide a strong, multiple-segment, reversible, flexible shaft housed within a bendable pipe casing that will allow for substantial longitudinal end-to-end axial tolerances without sacrificing circumferential integrity from one segment of the shaft to the next.

A flexible, reversible, rotatable shaft is disclosed that will accommodate for axial misalignments between an input and an output shaft. The outer tubular pipe has a first and a second end. The input shaft is positioned concentrically within the first end of the pipe. The output shaft is positioned concentrically within the second end of the pipe. The flexible pipe serves as a bearing surface for the input and output shafts. One or more substantially cylindrically-shaped shaft segments having first and second ends are connected between the input and output shafts in the tubular pipe. The first end of the shaft segment defines at least one female notch opening formed axially within the first end of the shaft segment. The second end of the segment defines at least one male tooth extending axially from the second end of the segment. The male tooth portion of the segment interfits within at least one entrance notch opening formed by an adjacent shaft member. Means are formed in the first slotted or notched end of the shaft segment wherein the at least one male tooth is free to move within the confines of the at least one notch opening, thus allowing for axial flexibility between shaft segments within the tubular pipe.

The notch formed in the first end of the segment further includes diverging substantially axially aligned walls formed by the segment. The walls start at a narrow entrance notch opening at the first end of the segment to a wider notch portion at the termination end of the notch. A male tooth portion extends from the second end of the shaft segment in an axial direction, the walls of the tooth extending parallel with the tubular pipe and the tooth interfits within the entrance notch opening formed by the first end of the shaft segment. Since the tooth portion that extends axially has parallel walls, the end of the tooth is free to move within the wider, diverging section of the notch formed in the first end of the shaft segment. Thus, one segment can move relative to an adjacent segment to accommodate for axial misalignment from one segment to the next within the confines of the diverging walls of the notch.

Each segment may have crossed notches and crossed tooth segments wherein the notches and the teeth are 90° one from the other, thus providing a self-aligning feature from one segment to the next while providing additional strength to transmit rotational forces along the segmented, flexible shaft.

In addition, the input and output shafts at opposite ends of the multiple intermediate shaft segments from internal passages. Each of the individual shaft segments form communicating internal passages. The internal passage is used to transmit lubricating fluid centrally through the flexible shaft so that the shaft is lubricated within the pipe.

Each of the individual shaft segments are additionally provided with rounded, substantially cylindrical walls wherein the wall portion of each cylinder is slightly rounded to provide a convex shape so that the shaft segment may rotate within the tubular pipe with a minimum of rotational friction. The barrel shape of the segments helps prevent the segments from catching on the inside wall of the flexible pipe.

Therefore, an advantage over the prior art is the ability to provide a rotatable, flexible shaft that accommodates for axial misalignments of an input and an output shaft yet provides a means for eliminating the rotational slack generated from one segment to the next by the unique method in which each segment is interfitted within an adjacent segment.

Yet another important advantage over the prior art is the ability to provide a strong, flexible shaft that is reversible. The flexible shaft performs equally well whether rotating clockwise or counterclockwise. State of the art wound steel wire flexible shafts will only rotate in one direction. If the rotation is reversed, the wound shaft will expand within the confines of a tubular outer pipe and bind in the pipe.

The above noted objects and advantages of the present invention will be more fully understood upon a study of the following description in conjunction with the detailed drawings.

BRIEF DESCRIPTION OF THE DRAWINGS

FIG. 3 is a perspective view of a single segmented shaft portion.

FIG. 4 is a side elevational view of one segment with a partially cutaway segment interconnected thereto, illustrating the means in which the male and female portions interfit together.

DESCRIPTION OF THE PREFERRED EMBODIMENTS AND BEST MODE FOR CARRYING OUT THE INVENTION

Figure 1:
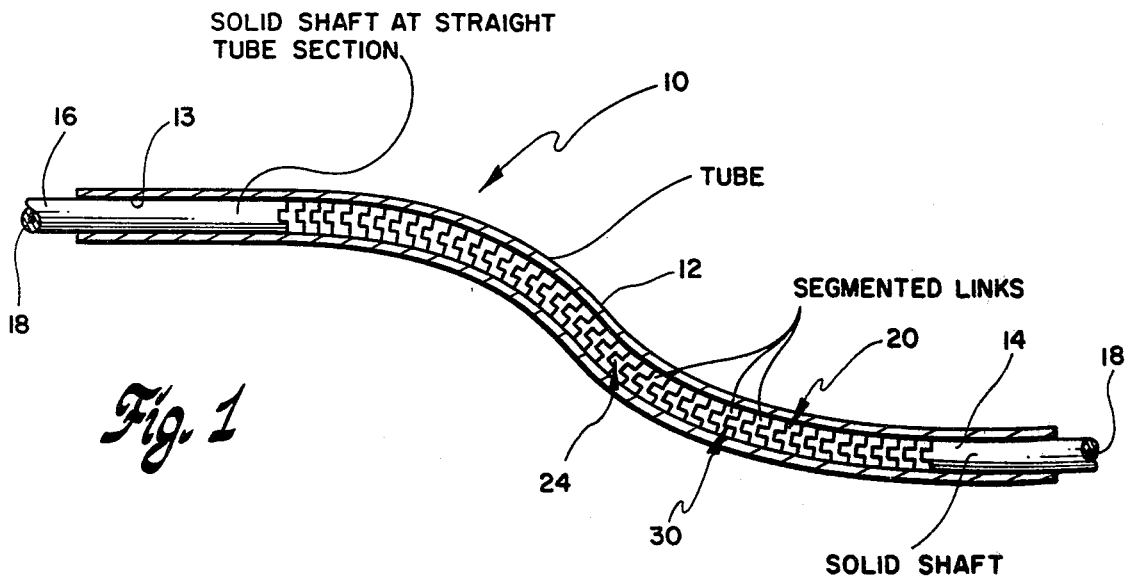
FIG. 1 is a partial side elevational section of a flexible shaft of the preferred embodiment of the invention.

With reference to FIG. 1, the flexible shaft, generally designated as 10, is comprised of an outer, tubular, bendable pipe 12 that houses an input shaft 14 and an output shaft 16. Intermediate the input and output shafts 14 and 16 are a multiplicity of individual segments or links, generally designated as 20. The links 20 are confined by the interior walls 13 of the outer tube or pipe 12. The flexible shaft 10 may be lubricated by providing a lube hole or passage through the input and output shafts and through each of the individual segments 20. The lube hole 18 provide lubrication and coolant fluid for each of the interlinked segments as well as the interior walls 13 of tube 12.

Figure 2:
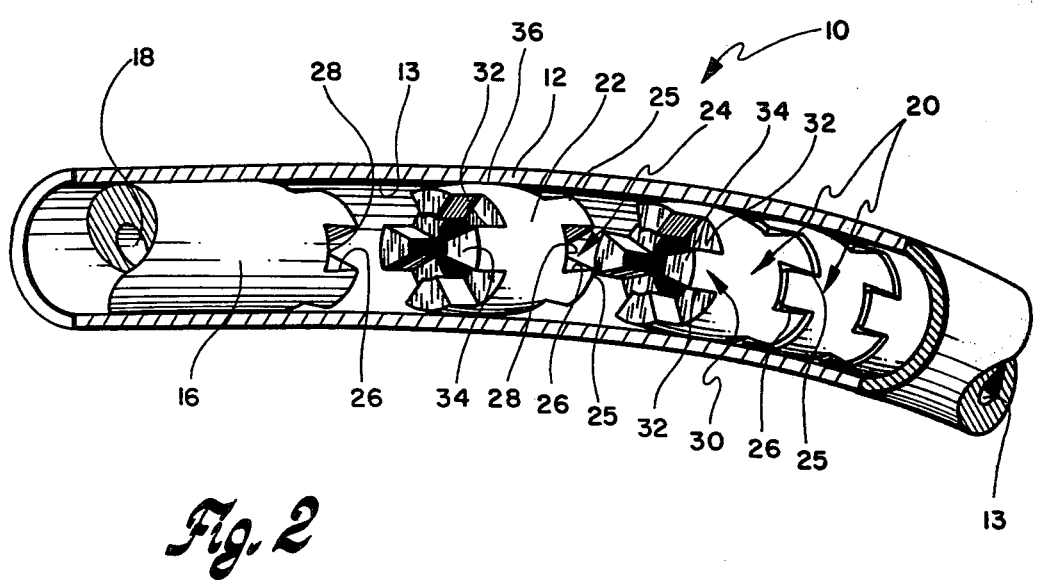
FIG. 2 is a partially cutaway perspective view of a portion of the flexible shaft illustrating the individual segments and how they interconnect with one end of a solid takeoff shaft.

Referring now to the greater detail of FIG. 2, each of the segments 20 interfit with an adjacent segment in the following manner. The segments 20 are generally cylindrical in shape, however, the outer walls 22 of each of the segments 20 are slightly convex or barrel-shaped so that the apex 36 along the surface 22 of segment 20 contacts the inner wall 13 at point 36. In other words, the only part of each segment that contacts the inner wall 13 of tubular pipe 12 is the central portion of each segment 20. The slotted or notched end 21 and the opposite tooth end 23 of segment 20 are smaller in diameter than the diameter at apex 36 of segment 20. If each segment 20 were a true constant diameter cylinder rather than a barrel shape, as shown in FIGS. 3 and 4, the ends 21 and 23 of the segments would dig into walls 13 of tubular pipe 12. This will occur when the pipe is curved to accommodate input and output shaft misalignments.

Each segment 20 at end 21 forms a series of flaired notches or slots 24. An entrance opening 25 merges into diverging walls 26 that terminate at radial wall 28 in the segment. The opening 24, of course, is wider at termination wall 28 than it is at the slot or notch entrance 25. At the opposite end 23 of segment 20 is a series of teeth 30 that axially extend from the segment 20. Each tooth 30 has parallel, axially aligned walls 32 that terminate at tooth end 34. The distance between parallel walls and the cross-sectional shape of the tooth corresponds generally to the opening entrance 25 of notch 24. When the tooth 30 is engaged with the notch 24 of an adjacent segment, a close tolerance fit is achieved at entrance 25 to notch 24. The end 34 of tooth 30, however, is free to move radially within the confines of the diverging walls 26 of notch 24. Thus, each segment can move relative to an adjacent segment, within the confines of interior wall 13 of tube 12. The distance each segment can move is dictated by the width of the notch 24 at its end 28. An advantage, of course, is that none of the segments 20 need be fully engaged with the notches 24. The parallel walls 32 of the tooth will engage the close fitting entrance opening 25 of each of the notches 24 from the tooth end 34 to the base of the tooth 33. There can be no rotational slack introduced if one of the segments should happen to back out of the notch. This relationship is clearly shown with reference to FIG. 4.

FIG. 4 additionally illustrates the contact of the barrel-shaped segment 20 with the inner wall 13 of tube 12 at apex 36 of each segment. Also, the relationship of the tooth 30 that is engaged with the notch or groove 24 is clearly shown. Moreover, it can readily be seen that the tolerances at entrance opening 25 of notch 24 determine the amount of give or slack allowed between segments where the tooth 30 engages with the entrance 25 of slot 24. Theoretically there could be almost zero tolerances between segments by closely fitting the tooth 30 with the entrance 25, yet there would still be room for axial misalignments between segments due to the diverging or flaired walls 26 of notch 24. The internal passage or oil hole 18 allows lubricating fluid to pass through the center of the flexible shaft and out through each of the connections between segments to the walls 13 of tube 12, thus providing lubrication for the flexible shaft during operation.

Referring again to FIG. 3, the segment 20 is so configured so that maximum strength is designed into the segment. Each of the teeth 30 is equidistantly spaced around the circumference of end 23 of segment 20. The teeth are wedge-shaped in configuration in the radial direction and the section of each tooth 30 equals the gap distance between teeth, thus equally distributing the mass of the segment around end 23. By making the teeth wedge-shaped, maximum strength is achieved from the outer peripheral edge to the internal fluid passage 18. The depth of each of the slots 24 is about one-quarter to one-third the diameter of each of the segments and, of course, each of the teeth protruding from the segment is about one-quarter to one-third in length to the diameter of the segment 20. Thus, each segment is so configured to provide maximum strength from segment to segment, thus obviating any chance for a weak link in the flexible shaft from the input shaft 14 to the output shaft 16.

Each of the segments is preferably fabricated from stainless steel for strength but it would be obvious to fabricate each segment from, for example, plastic or a composite reinforced material such as fiberglass. The flexible shaft can be so configured to accommodate the particular power transmission means in which it is to be used.

One of the distinct advantages of the flexible shaft is the ability of the shaft to be reversed. Hence, the apparatus has an ideal application in drive shafts for power boats. For example, the input shaft 14 can be the power takeoff shaft of an engine and the output shaft 16 can be connected to the propeller of the boat. The steel segments within, for example, a brass, outer, tubular, bendable pipe will easily transfer the relatively high engine torque to the propeller. There would indeed be a tremendous amount of torque in this particular application. Hence, close tolerances between the teeth 30 and the notches 24 would be essential. Additionally, the shaft would work equally well in forward or in reverse in the boat application. This particular application is uniquely suited to the boat application in that the segmented shaft will take tremendous amounts of torque.

There are many other applications, of course, for a flexible shaft. For example, a rotatable television antenna could be operated by this type of shaft and the materials utilized to fabricate the flexible shaft could then be inexpensive plastic pipe with plastic or fiberglass intermeshed segments making up the flex shaft unit to remotely rotate a television antenna from within the confines of a home.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A flexible, reversible, rotatable shaft that will accommodate for axial misalignments between input and output shafts comprising:

an outer, tubular, flexible pipe having a first and a second end, said input shaft being positioned concentrically within said first end of said pipe, said output shaft being positioned concentrically within said second end of said pipe, said flexible pipe serving as a bearing surface for said input and output shafts; and one or more substantially cylindrically shaped shaft segments having first and second ends connected between said input and output shaft in said pipe, said first end of said segment defining crossed notch openings, each notch being substantially 90° apart, formed axially within said first end of said shaft segment, said second end of said segment defining crossed teeth extending axially from said second end of said segment, each tooth being substantially 90° apart, said notch openings formed in said first end of said segment further including diverging substantially axially aligned walls formed by said segment from a narrow entrance notch opening to a wider notch portion at the termination end of said notch, said crossed teeth extending axially from said second end of said segment having parallel axially aligned walls, the tooth portion of said segment interfits within said notch openings formed by an adjacent shaft segment, said crossed teeth being free to move within the confines of said diverging walls of said notch openings, thus allowing for axial and longitudinal flexibility between shaft segments within said tubular pipe while the inner portion of said crossed teeth remain in intimate contact with said entrance opening of said notch openings.

* * * * *